Sept. 18, 1928.
A. G. NORTON
1,684,880
PUMP
Filed Aug. 8, 1927
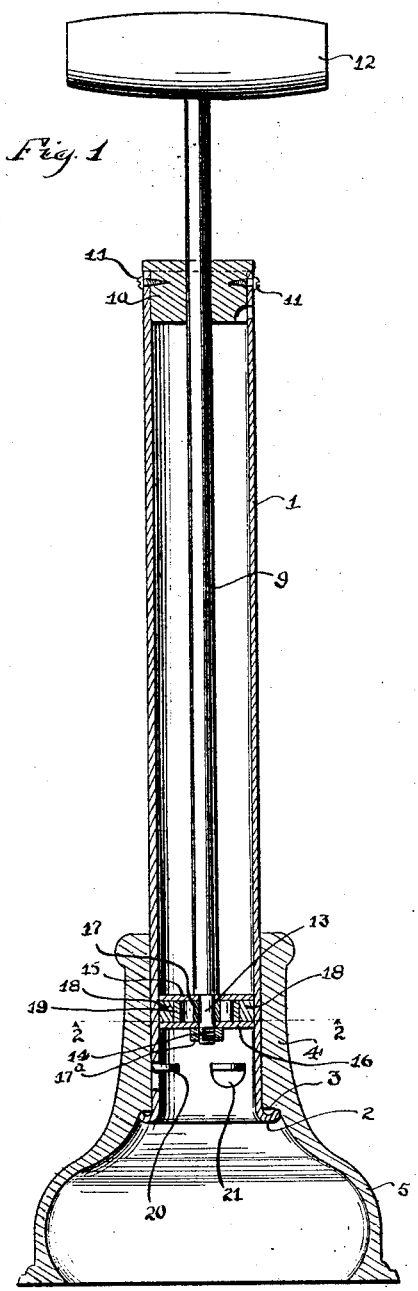
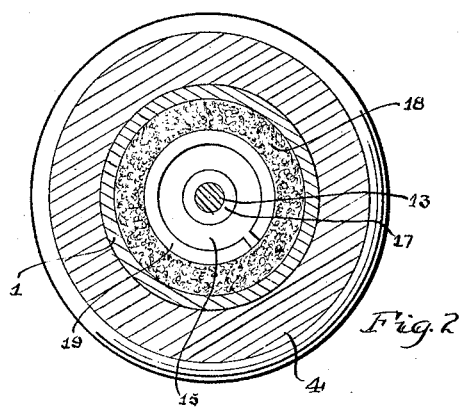
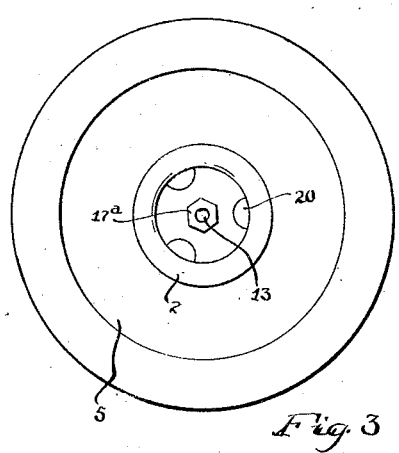
INVENTOR
Arthur G. Norton
BY
W. H. Simms
his ATTORNEY Patented Sept. 18, 1928.

1,684,880

UNITED STATES PATENT OFFICE.

ARTHUR G. NORTON, OF HOLLEY, NEW YORK, ASSIGNOR TO ALERT PRODUCTS, INC., OF HOLLEY, NEW YORK, A CORPORATION OF NEW YORK.

PUMP.

Application filed August 8, 1927. Serial No. 211,271.

The present invention relates to pumps and an object of the same is to provide a novel means of limiting the movement of the piston in the cylinder. Another object of the invention is to provide a novel connection between the sealing cup and the cylinder.

To these and other ends, the invention consists of certain parts and combinations of parts all of which will be hereinafter described: the novel features being pointed out in the appended claims.

In the drawings:

Fig. 1 is a sectional view through a pump constructed in accordance with this invention;

Fig. 2 is an enlarged section on the line 2—2: Fig. 1; and

Fig. 3 is a bottom view of the pump.

The present invention is shown and described in connection with a combined suction and force pump designed for cleaning stop drains, bowls and toilets but it is to be understood that the invention is not limited to pumps of this type.

In the illustrated embodiment, 1 indicates the cylinder which is in the form of an open-ended tube, the lower end of which is rolled outwardly at 2 to provide a shoulder or bead to engage the internal shoulder 3 at the inner end of a sleeve 4 projecting from the flexible sealing cup 5 made, in this instance, of rubber in one piece with the sleeve 3.

With the end in view of effectively securing the sealing cup to the cylinder 1, the internal diameter of the sleeve 4 is made considerably less than the external diameter of the cylinder 1. The sleeve is expanded, then arranged around the cylinder and permitted to contract so as to snap behind the roll portion 3, thus providing a binding engagement with the cylinder and prevent the sleeve moving in either direction on the cylinder.

Operating in the cylinder is a piston rod 9 which, in this instance, is guided in a central opening in a plug 10 fitted in the upper end of the cylinder and held therein by screws 11, the rod 9 having a handle 12 above the plug. This piston rod has its lower end reduced at 13 and is externally threaded at 14 at the end of the reduced portion. Two plates 15 and 16 fit on this reduced portion 13 and are held in spaced relation by a spacing ring 17 which surrounds the reduced portion between the two plates. A nut 17ᵃ on the threaded portion 14 holds the plates in position. A packing ring 18 is arranged between the two plates and has a slightly greater diameter than the latter so as to engage with the interior walls of the cylinder 1. A split resilient ring 19 lies within the packing ring 18 between the two plates 15 and 16 and tends to expand the packing ring 18 into yielding engagement to the interior wall of the cylinder 1.

The movement of the piston in the cylinder may be limited in one direction by lugs 20 projected inwardly from the walls of the cylinder adjacent its lower end. In this instance, these lugs 20 are cut from the stock of the cylinder 1, thus providing openings 21 in the cylinder walls. These openings are closed by the sleeve 4. In order that the plug 6 may not interfere with these lugs 21, said plug has radial grooves 22 which receive the lugs 20.

It is apparent that the movement of the piston in the cylinder in one direction tends to create a pressure in the sealing cup while the movement of the piston in the other direction tends to reduce such pressure and create a partial vacuum. When this device is used for cleaning drains, bowls and toilets, this alternate pressure and partial vacuum tends to disturb or agitate the contents of the stopped drain, bowl or toilet so that the obstruction is eventually broken down. The means of securing the sealing cup to the cylinder gives an effective connection between these two parts which will not become separated in use. A novel and inexpensive means is provided for limiting the movement of the piston in one direction, this means being in the form of inwardly extending lugs cut from the stock of the cylinder and providing openings which are closed effectively by the sleeve of the sealing cup.

What I claim as my invention and desire to secure by Letters Patent is:

1. A pump comprising a cylinder having an outwardly extending roll at one end and also having a uniform exterior diameter above said roll, and a sealing cup formed of rubber and having a sleeve at one end with a uniform interior diameter throughout and a shoulder at the inner end of the sleeve engaging behind the roll on the cylinder, the interior diameter of the sleeve when detached from the cylinder being less than the external diameter of the cylinder and the sleeve being held in a stretched condition in engagement with the external wall of the cylinder and behind such outwardly extending roll.

2. A pump comprising a cylinder, a piston movable therein, limiting lugs for the piston cut from the stock of the cylinder and extending inwardly, and a sealing cup having a sleeve surrounding said cylinder adjacent said lugs to close the openings in the cylinder made by the formation of the lugs.

ARTHUR G. NORTON.